US009647922B2

(12) United States Patent
Mortimore, Jr. et al.

(10) Patent No.: US 9,647,922 B2
(45) Date of Patent: May 9, 2017

(54) COMPUTER IMPLEMENTED METHODS AND APPARATUS FOR TRIALS ONBOARDING

(71) Applicant: salesforce.com, inc., San Francisco, CA (US)

(72) Inventors: William Charles Mortimore, Jr., San Francisco, CA (US); George John Murnock, Jr., Firestone, CO (US); Reid A. Elliott, Denver, CO (US); Ture Hoefner, Golden, CO (US); Robert Michael Fitzpatrick, Denver, CO (US); Dileep Burki, San Jose, CA (US); Doug Bitting, Pleasanton, CA (US); Erik Jeffrey Nierenberg, San Carlos, CA (US); Akhilesh Gupta, San Francisco, CA (US)

(73) Assignee: salesforce, inc., San Francisco, CA (US)

( * ) Notice: Subject to any disclaimer, the term of this patent is extended or adjusted under 35 U.S.C. 154(b) by 426 days.

(21) Appl. No.: 14/278,987

(22) Filed: May 15, 2014

(65) Prior Publication Data

US 2014/0344435 A1  Nov. 20, 2014

Related U.S. Application Data

(60) Provisional application No. 61/823,799, filed on May 15, 2013.

(51) Int. Cl.
*G06F 15/173* (2006.01)
*H04L 12/26* (2006.01)
*H04L 12/24* (2006.01)

(52) U.S. Cl.
CPC .......... *H04L 43/50* (2013.01); *H04L 41/5051* (2013.01)

(58) Field of Classification Search
CPC .......... G06F 17/30905; G06Q 10/0633; H04L 41/5054; H04L 47/70; H04N 21/25825; H04N 21/25833; H04N 21/2662; H04N 21/4622
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Shean Tokuta
(74) *Attorney, Agent, or Firm* — Weaver Austin Villeneuve & Sampson LLP

(57) ABSTRACT

Disclosed are methods, apparatus, systems, and computer readable storage media for trials onboarding. A server may receive a request to generate a trial instance of an organization providing data and functionality for a period of time. Data on the request may also be stored. The trial instance may be selected from a template based on an access channel corresponding to the request.

12 Claims, 9 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,443,085 B2 | 5/2013 | Jensen-Horne et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,775,946 B2 | 7/2014 | Jensen-Horne et al. |
| 8,904,011 B2 | 12/2014 | Jensen-Horne et al. |
| 8,973,106 B2 | 3/2015 | Warshavsky et al. |
| 9,037,722 B2 | 5/2015 | Jensen-Horne et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |

(56) References Cited

U.S. PATENT DOCUMENTS

| | | |
|---|---|---|
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2011/0276890 A1 | 11/2011 | Jensen-Horne et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0205370 A1* | 8/2013 | Kalgi .................. H04W 12/10 726/3 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0006441 A1 | 1/2014 | Torman et al. |
| 2014/0013400 A1 | 1/2014 | Warshavsky et al. |
| 2014/0019880 A1 | 1/2014 | Kucera et al. |
| 2014/0075031 A1* | 3/2014 | Doering ............ H04L 41/5041 709/226 |
| 2014/0075034 A1* | 3/2014 | Vasudevan ............ H04L 47/70 709/226 |
| 2014/0109188 A1* | 4/2014 | Pavlov .................. G06F 21/00 726/4 |
| 2014/0325374 A1* | 10/2014 | Dabrowski ........... G06F 9/4443 715/744 |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

\* cited by examiner

COMPUTER IMPLEMENTED METHODS AND APPARATUS FOR TRIALS ONBOARDING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

PRIORITY DATA

This patent document claims priority to co-pending and commonly assigned U.S. Provisional Patent Application No. 61/823,799, titled "In App Trials Onboarding," by Mortimore, et al., filed on May 15, 2013, which is hereby incorporated by reference in its entirety and for all purposes.

TECHNICAL FIELD

This patent document relates generally to a trial organization providing a set of data and functionality, and more specifically, instantiating trial organizations associated with different users and/or sources.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed inventive systems, apparatus, methods and computer readable media for trials onboarding. These drawings in no way limit any changes in form and detail that may be made by one skilled in the art without departing from the spirit and scope of the disclosed implementations.

DETAILED DESCRIPTION

Figure 1:
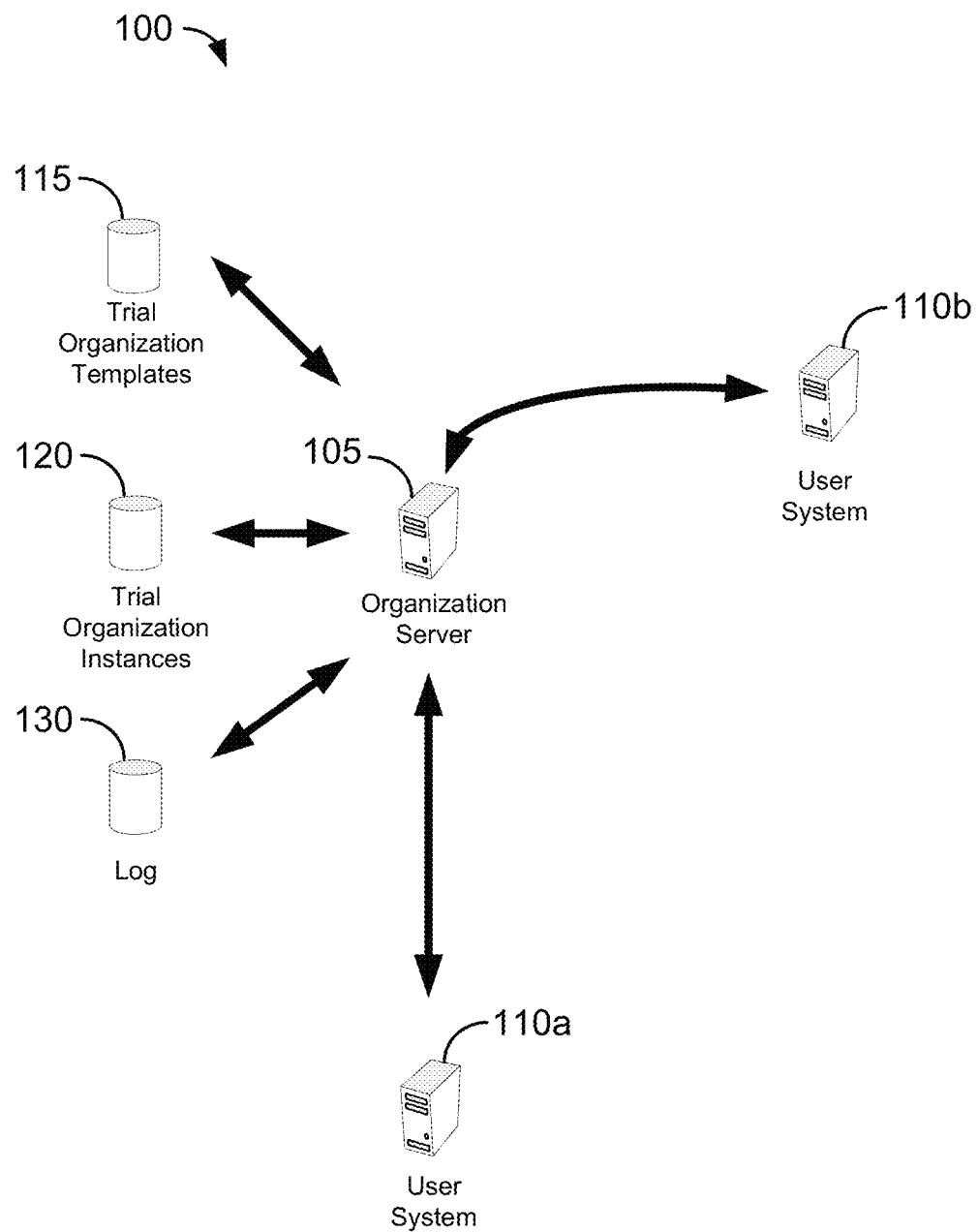
FIG. 1 shows a system diagram of an example of architectural components 100 for trials onboarding according to some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different systems, apparatus, methods, and computer-readable storage media for trials onboarding. For example, an independent software vendor (ISV) may work with another corporation's operating environment. The corporation's operating environment may provide products for a variety of markets to solve a variety of problems. The products may utilize data within a "core" and functionality and features within a "platform." A number of different problems for various industries may be solved by products using the operating environment. For example, the corporation may include products to facilitate sales-related customer relationship management (CRM). The products using the operating environment may use an on-demand services environment (e.g., a multi-tenant database system).

In some instances, the ISV may wish to create a new solution to another market using the core and platform of the corporation's operating environment. Additionally, the ISV may wish to provide its customers access to trials of its new solution.

As an example, an ISV may be a bank. The bank may wish to create a new product using the corporation's operating environment to address a problem in a new vertical market that is currently not being served by the existing products. Accordingly, the bank may use the core and platform of the corporation to create a new product. For example, the bank may develop a new financial business-related product to address an issue within the financial and banking industry. The data for the product may be stored in the core of the corporation's operating environment (e.g., as records in databases). The features of the product may be built using a software development platform of the platform. As such, the ISV may provide a new product using the core and platform of the operating environment of the corporation. The product may also be available in an on-demand services environment. Though the ISV in this scenario is a bank, in other scenarios the ISV may be any other type of business. For example, the ISV may be a software vendor providing notetaking and archiving features.

The ISV may develop an application to provide access to the product. For example, the bank may create an application for a smartphone that provides access to the financial business product. The bank may also create a website providing access to the product. Accordingly, various different "access channels" may provide users with the data and functionality of the financial business product.

The ISV may also wish to allow its customers to sign up for a trial of the product through the application. For example, the bank may want its customers to sign up for a trial of the financial business product through the smartphone application. Accordingly, customers of the bank may sign up for a trial through the smartphone application. When a trial is requested, an "instance" of the financial business product may be generated and stored within the core of the operating environment that the bank is building upon. Each trial may be a "trial organization" of the product within the operating environment provided by the other corporation (i.e., the corporation's operating environment that the ISV is building upon).

As an example, the financial business product may be a records management program for financial transactions. Financial transactions may be recorded by the product and stored within the operating environment (e.g., in a database in the core). Additionally, data on the financial transactions may be retrieved from the core and displayed on a screen of a computing device. Depending on the functionalities of the platform that are used by the product, the financial data may also be visually displayed, for example, as a graph, chart, or other visual design. Other functionalities, such as data models, ability to create new users, permissions, license management, etc. may also be provided by the platform and used by the product.

Additionally, the ISV may want the creation of the trials to be "headless." That is, the ISV may want its customers to be able to sign up for a trial without a login or signup screen for the corporation providing the operating environment that the ISV's product is built upon. For example, the bank may allow its customers to use the smartphone application to generate a new trial of the product without requiring a login and/or signup process provided by the corporation providing the operating environment. Accordingly, the bank's customer may have access to a trial of the bank's product running on the corporation's operating environment without having the other corporation provide an account email, login process, signup process, or other process in order for the bank's customer to try out the product.

Additionally, the ISV may provide different templates of its product to different users. The templates may be used to generate the trials of the product. For example, the bank may create several different templates of its product. The bank may create one template providing one set of data and functionality to its customers who generate a trial through the smartphone application. Customers who generate a trial through the website may be provided a separate set of data and functionality. The bank may also update the product and new users may be provided a template with new features provided by the update while older users may still use the older template without the new features. As such, the bank may be able to tell if the new features are encouraging its customers to sign up for the product based on the trial.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

Online social networks are increasingly becoming a common way to facilitate communication among people who can be recognized as users of a social networking system. Some online social networks can be implemented in various settings, including organizations, e.g., enterprises such as companies or business partnerships, academic institutions, or groups within such an organization.

In some online social networks, users can access one or more social network feeds, which include information updates presented as items or entries in the feed. Such a feed item can include a single information update or a collection of individual information updates. A feed item can include various types of data including character-based data, audio data, image data and/or video data. For example, a post related to an online marketing campaign may appear as a feed item. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

FIG. 1 shows a system diagram of an example of architectural components 100 for trials onboarding according to some implementations. Architectural components 100 may provide communications to be transmitted among a variety of different hardware and/or software components. For example, architectural components 100 may include organization server 105, user system 110a, user system 110b, trial organization templates 115, trial organization instances 120, and log 130.

User systems 110a and 110b may be any type of computing device. For example, user systems 110a and 110b may be portable electronic devices such as smartphones, tablets, laptops, wearable devices (e.g., smart watches), etc. User systems 110a and 110b may be another server or a desktop computer. Additionally, user systems 110a and 110b may be different types of computing devices. For example, user system 110a may be a desktop computer whereas user system 110b may be a smartphone.

In some implementations, organization server 105 may receive requests from user system 110a and user system 110b, analyze the requests, and obtain and/or store data in trial organization instances 120 and log 130. User system 110a and user system 110b may also obtain data from organization server 105 and provide information to a user, for example, via a display. Accordingly, various components are able to communicate with each other, for example, over the Internet or a combination of networks including the Internet.

As an example, an ISV may create a product on another corporation's operating environment, as previously discussed. Trial organization templates 115 may include a variety of different templates for instances of the product. Continuing with the example of the bank as discussed above, different templates for the instances of the product may include different features and details. For example, the bank may have one template providing the product with one visual look (e.g., having one background color) and a second template providing the product with a second visual look (e.g., having another background color). Accordingly, user system 110a may request the generation of a trial of the product and be provided an instance providing one background color while user system 110b may request the generation of the product and be provided with a different background color.

As an example, the financial business product may be a records management program for financial transactions, as previously discussed. Data on the financial transactions may be retrieved from the core and displayed on a screen of a computing device. User system 110a may be provided a display with financial data with a red background while user system 110b may be provided with a display with financial data with a green background because different instances of the product may be generated.

Additionally, the different templates may include different data. For example, the product implemented by the bank may include a variety of data stored in the core of the operating environment, as previously discussed. As an example, the bank may provide each instance of the trial with pre-populated data so that the customer can see and test how the product functions. One template may have access to all of the data. However, another template may have access to only a subset of the data.

Additionally, the different templates may include different functionalities. For example, one template of the product may include functionality to add data for the instance. Accordingly, the user may be able to add his or her own data and test the functionality of the product with the newly added data. However, another template may exclude the functionality to add data for the instance. That is, the user of the template may only be able to test a trial of the product using pre-populated data provided by the ISV (e.g., the bank).

Additionally, different instances of templates may be valid for different periods of time. For example, each trial may be active for a particular time. If a trial is generated (i.e., an instance of a template is generated) and the template indicates that the instance is to be active for one month, then the instance in trial organization instances 120 may be accessible by user system 110a for one month. After a month, organization server 105 may determine that the instance in trial organization instances 120 is no longer accessible to user system 110a, and therefore, prohibits user system 110a from accessing the instance in trial organization instances 120. In some implementations, the instance may be accessible again to user system 110a if a subscription or purchase is made to convert the trial from the one month trial to a full product or a longer period.

Trial organization instances 120 may store instances of each trial of the product (or trial organization) as discussed above. For example, if user system 110a requests an instance of the trial of the product to be generated, a "copy" of a template may be instantiated and stored in trial organization instances 120. Each instance stored in trial organization instances 120 include its own data and functionality, as previously discussed.

Log 130 may store data regarding the communications and actions of the components of architectural components 100. Log 130 may store data on each transaction from user system 110a and user system 110b. For example, user system 110a may include a smartphone application to provide access to a trial of the product (e.g., the financial business product as previously discussed). To request a trial of the product, a user may provide data by filling out a form. For example, data may include a name (e.g., first name and last name), country of the user requesting the trial, business name, or other information on the user. The requested data may be stored in log 130.

Additionally, log 130 may store results of the requests to generate an instance. For example, whether each request is successful or unsuccessful in generating an instance may be recorded. In some implementations, a request may not be successful if a server (e.g., one of architectural components 100) is down, a requested template does not exist (e.g., it was deleted by the ISV), or other scenario. Accordingly, customer information corresponding to those wanting to try out the trial of the product may be recorded. As such, future customer leads may be generated based on the customer information, including from customers who were not successful in generating an instance of the trial.

Figure 2:
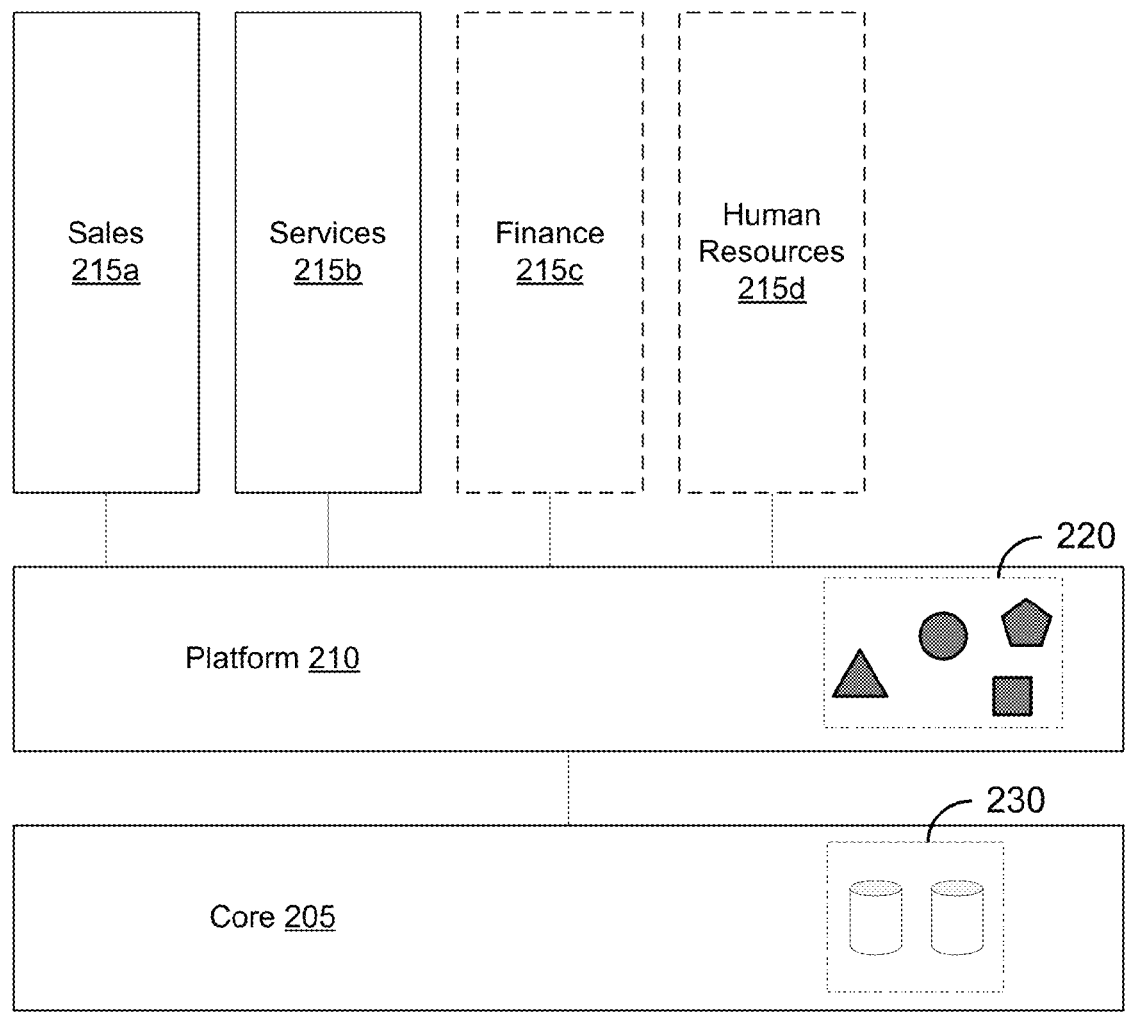
FIG. 2 shows an example of an operating environment according to some implementations.

FIG. 2 shows an example of an operating environment according to some implementations. In FIG. 2, the operating environment may include core 205, platform 210, and products 215a-215d. In FIG. 2, sales 215a, services 215b, finance 215c, and human resources 215d may be products directed towards different solutions. As an example, sales 215a and services 215b may be provided by the same entity providing the operating environment. Finance 215c may be a product created by an ISV (e.g., the bank) to address a problem in the financial industry. Likewise, human resources 215d may be another product created by another ISV to address another problem (e.g., managing data in a human resources department).

Each of sales 215a, services 215b, finance 215c, and human resources 215d may use functionalities 220 provided by platform 210 to build on top of the platform 210 to solve various problems. For example, platform 210 may be a software development platform providing capability to write code (e.g., Apex), develop a user interface (e.g., with Visualforce® provided by salesforce.com), and other features. Functionalities 220 may include existing features and functions which may be incorporated into sales 215a, services 215b, finance 215c, and human resources 215d. For example, functionalities 220 may include modules for user creation, license management, permission management, and other tools to allow ISVs to build products such as finance 215c and human resources 215d.

Core 205 may include databases 230 for storing data for sales 215a, services 215b, finance 215c, and human resources 215d. That is, the data used by customers of sales 215a, services 215b, finance 215c, and human resources 215d may be stored in databases 230. For example, trial organization templates 115, trial organization instances 120, and log 130 may be provided by databases 230 in core 205.

Accordingly, sales 215a and services 215b are products built on top of platform 210 and core 205. Platform 210 and core 205 may be provided by the same entity that provides the operating environment. Finance 215c and human resources 215d may be products that are also built on top of platform 210 and core 205, but created by another entity (e.g., an ISV) rather than the entity that provides the operating environment. Any of sales 215a, services 215b, finance 215c, and human resources 215d may be accessible to other customers (i.e., a customer as a third entity) other than the entities providing any of the features of FIG. 2.

Figure 3:
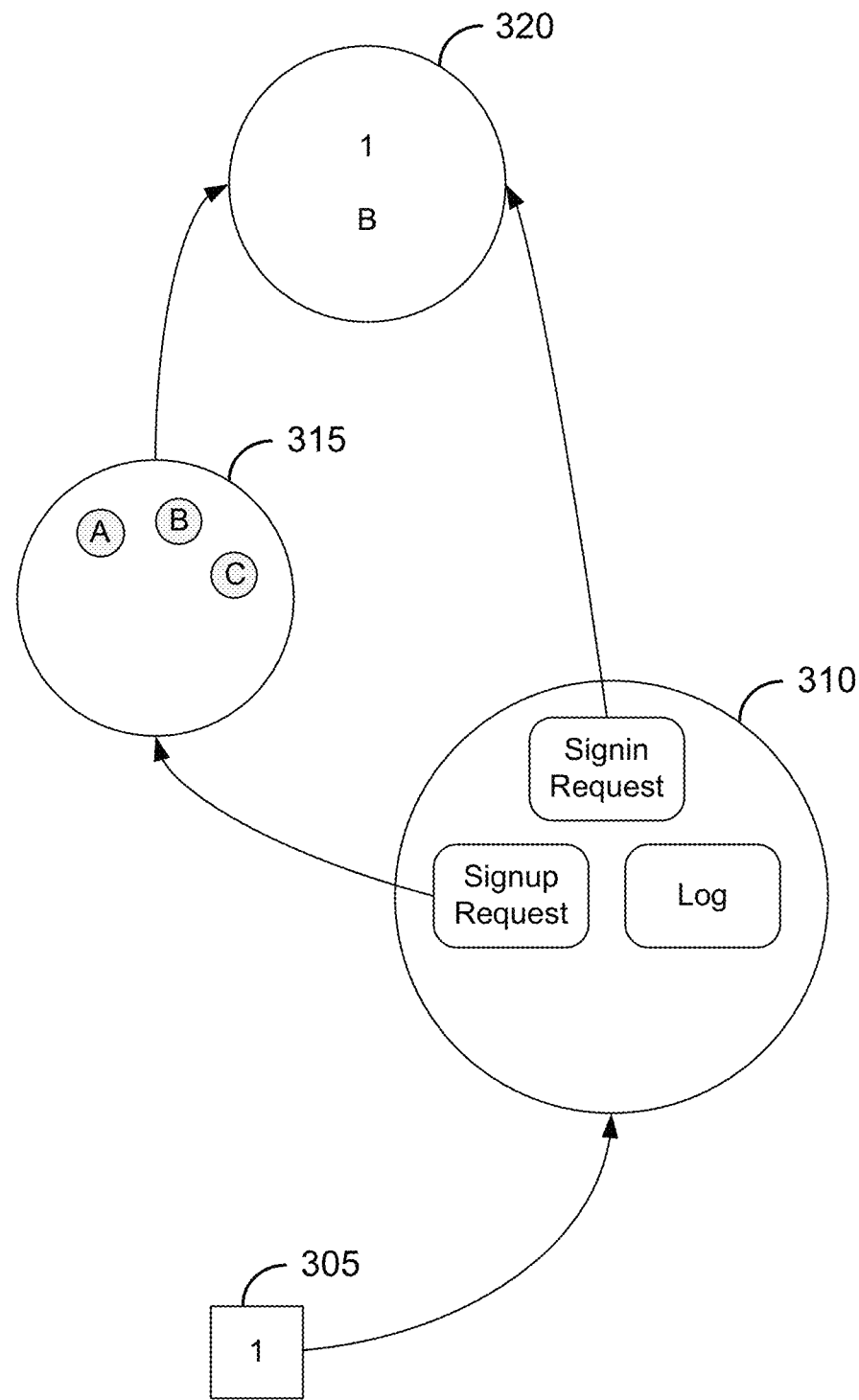
FIG. 3 shows an example of a trial onboarding according to some implementations.

FIG. 3 shows an example of a trial onboarding according to some implementations. In FIG. 3, management module 310, development module 315, and trial instance 320 may be part of a product (e.g., finance 215c developed by a bank). Development module 315 may also be referred to as a "development organization" that provides the bank with a space within the operating environment to develop their product. For example, the bank's software developers may develop finance 215c and provide instances A, B, and C of finance 215c. In some implementations, developers may log into the development organization, create the product (i.e., finance 215c), and then make finance 215c available to their customers. Management module 310 may also be referred to as a "manage my product organization" that provides an application programming interface (API) such that customers may generate trials of finance 215c (e.g., generate trial instance 320).

Management module 310 may provide an API for user system 305 to generate trial instance 320 based on templates provided by development module 315. For example, development module 315 may include templates A, B, and C to be selected and used to instantiate trial instance 320, as previously discussed.

Management module may include a variety of functionalities. For example, in FIG. 3, management module 310 includes functionality for a signup request, signin request, and a log. The signup request may indicate that one of templates A, B, and C is to be instantiated as trial instance 320. For example, user system 305 may indicate which of A, B, and C is to be instantiated. In other implementations, management module 310 may determine which of templates A, B, and C are to be instantiated. For example, the template may be selected based on the access channel associated with user system 305. For example, template A may be selected if user system 305 access management module 310 via a smartphone application. Template B may be selected if user system 305 accesses management module 310 via a web browser on a desktop computer. When trial instance 320 is generated by signup request of management module 310, signin request may allow user system 305 access to trial instance 320. The log of management module 310 may store details on user system 305, as previously discussed. Accordingly, the functionalities within management module 310 may be exposed via an API to user system 305. The API may further allow for user system 305 to access trial instance 320.

Figure 4:
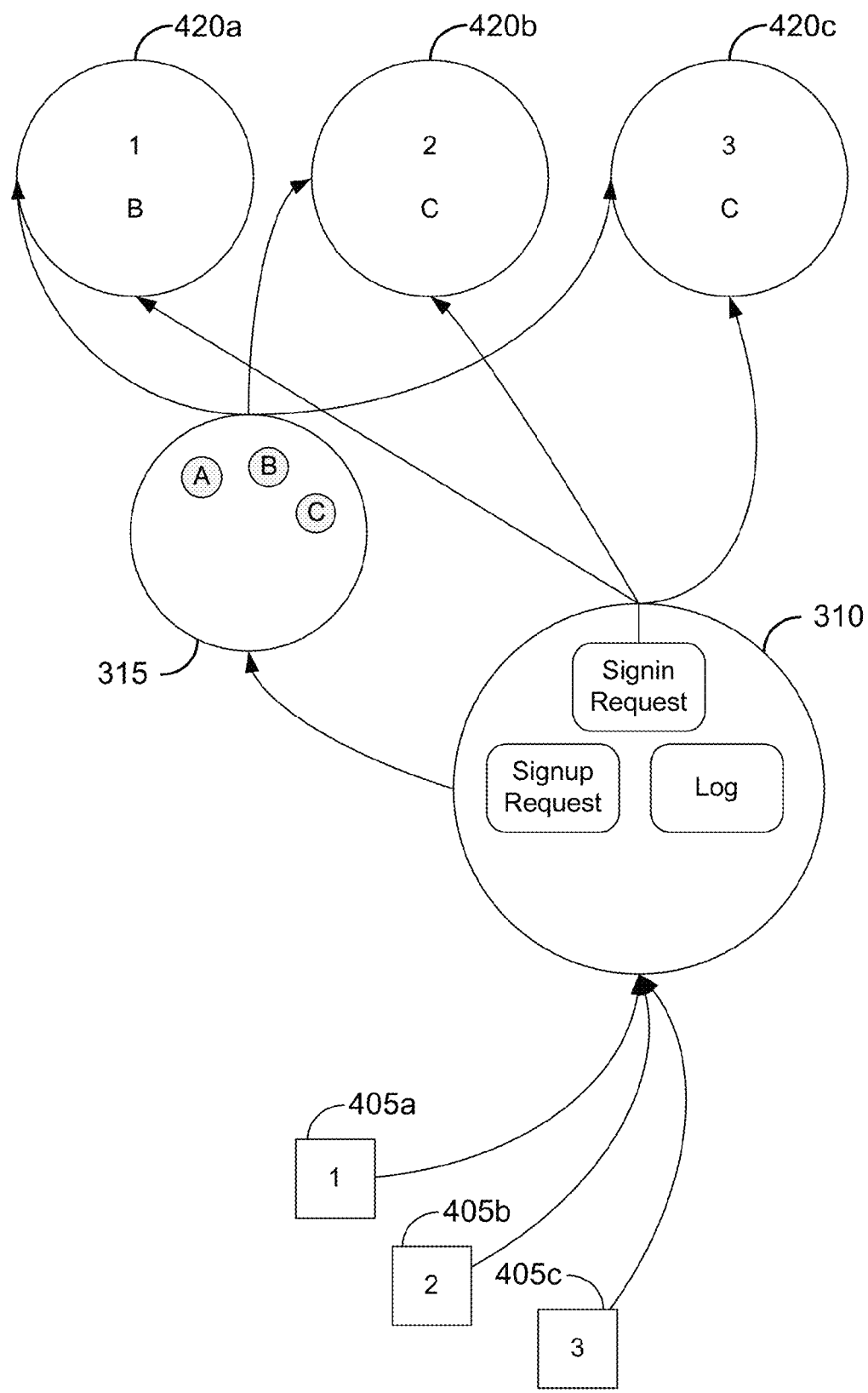
FIG. 4 shows examples of trials onboarding according to some implementations.

FIG. 4 shows examples of trials onboarding according to some implementations. In FIG. 4, user systems 405a-c may each request a generation of trial instances 420a-c, respectively. That is, trial instance 420a is associated with user system 405a and provides template B as the trial instance. Trial instance 420b is associated with user system 405b and provides template C as the trial instance. Lastly, trial instance 420c is associated with user system 405c and provides template C as the trial instant.

In some implementations, the templates may be selected based on the access channel corresponding to user systems 405a-405c. For example, if user systems 405b and 405c both request generated trial instances through a smartphone application, instance C may be selected by signup request of management module 310. User system 405a may request a generated trial instance through a web browser on a desktop computer, and therefore, instance B may be selected based on the request being through the web browser on the desktop computer. Additionally, each trial instance 420a-420c may be provided a time period for user systems 405a-405c to be able to access the respective trial instances based on the access channel. For example, template B may provide a trial instance to be active for 30 days while template C may provide a trial instance to be active for 45 days. Accordingly, different access channels may include different periods of time wherein they are active and, therefore, to be used as trials of the ISV's product.

In other implementations, the particular template may be selected by user systems 405a-405c based on a selection by a user. For example, a drop-down box in a form may allow a user to indicate which of templates A, B, or C to use for the trial instance.

Additionally, the different templates may provide different sets of data and functionality. One template providing one set of data and functionality may be provided to requests from a smartphone application. Customers who generate a trial through the website may be provided a separate set of data and functionality. The bank may also update the product and new users may be provided a template with new features provided by the update while older users may still use the older template without the new features. As such, the bank may be able to tell if the new features are encouraging its customers to sign up for the product based on the trial.

In some implementations, only a single template may be available and any request to generate a trial instance may use the single template. However, when new functionality or new pre-populated data is added by the ISV, a new template may be provided and each subsequent request to generate a trial instance may use the new template until additional functionality or data is added by the ISV. However, the prior generated trial instances may still be based on the templates that were used to generate them. That is, older trial instances based on older templates may still be active and be based on the older template while newer trial instances may be based on the newer template.

In some implementations, the pre-populated data and functionality may allow an ISV's customers to demo the product through the trial instance. The customers may be able to add new data, delete new or the pre-populated data, and test out the functionality (e.g., add new users, view data, etc.) within the time period that the trial instance is active.

In some implementations, the requests to generate trial instances 420a-420c may be received and put in a queue to generate the respective trial instances. For example, based on the load of the system, generating the trial instances may take a certain amount of time. That is, the generation may not be instantaneous. Accordingly, in the log managed by management module 310, the status of each request from user systems 405a-405c may be indicated in the log (e.g., log 130). As an example, each request may be indicated as in progress, complete, or unsuccessful.

The generation of the trial instances may be based on a first in, first out (FIFO) wherein the trial instances are generated based on the order the requests are received. However, in other implementations, each request may include a priority and the trial instances may be generated based on the priority. For example, the priority may be based on the country the request is received from, the customer company the request is from, the size of the customer company (e.g., as indicated by the user in a form to generate the trial instances, as previously discussed), access channel (e.g., emphasize a smartphone application access channel over a desktop computer), the particular template (e.g., template A may be prioritized over template B), or any other factor disclosed herein.

As previously discussed, the ISV may want its customers to be able to sign up for a trial without a login or signup screen for the corporation providing the operating environment that the ISV's product is built upon. For example, the bank may allow its customers to use the smartphone application to generate a new trial of the product without requiring a login and/or signup process provided by the corporation providing the operating environment. Accordingly, the bank's customer may have access to a trial of the bank's product running on the corporation's operating environment without having the other corporation provide an account email, login process, signup process, or other process in order for the bank's customer to try out the product. In some implementations, the customer may start to use the trial instance and set a username and/or password later.

As an example, the ISV may develop a smartphone application to generate requests for the trial instances of the product. As previously discussed, through the API provided by management module 310, a trial instance may be generated by the request from the smartphone application. In some implementations, the ISV may include functionality within the smartphone application to include a unique identifier, or key. The template (e.g., template C) may be associated with the identifier. Accordingly, when the smartphone application communicates with management module 310 to generate a trial instance, the trial instance may be based on the template corresponding to the same identifier as the smartphone application.

Figure 5:
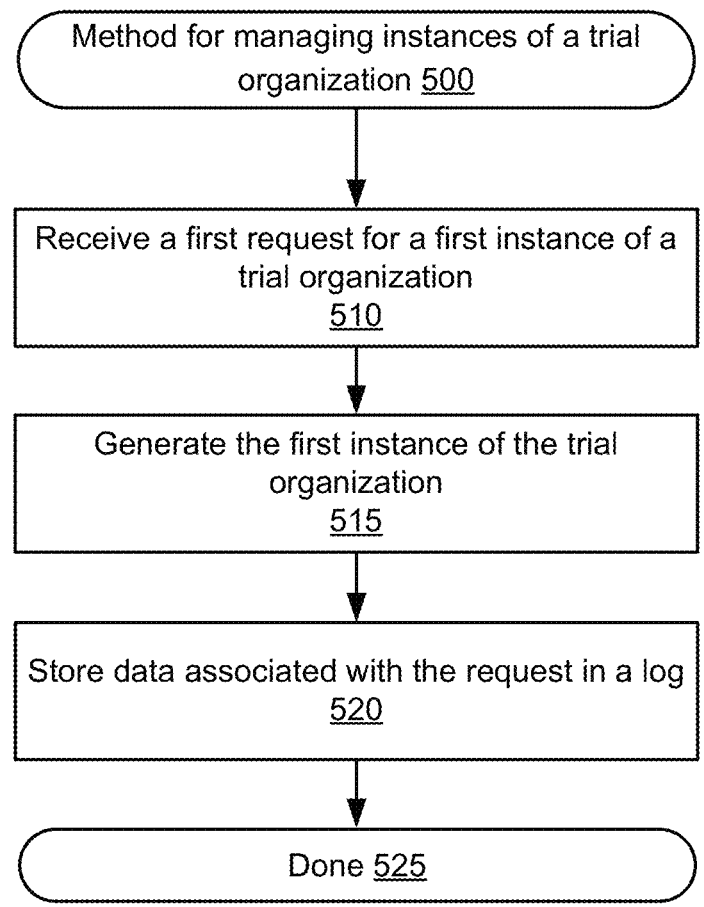
FIG. 5 shows a flowchart of an example of managing instances of a trial organization.

FIG. 5 shows a flowchart of an example of managing instances of a trial organization. Method 500 (and other methods described herein) may be implemented by the architectural components of FIG. 1. In various implementations, blocks may be reordered, omitted, combined, or split into additional blocks for method 500, as well as other methods described herein.

In block 510, a first request for an instance of a trial organization (trial instance) may be received. For example, management module 310 may receive the request from a user system.

In block 515, the instance may be generated. For example, a template provided by development module 315 may be selected to base the instance upon.

In block 520, data associated with the request for the instance may be stored in a log. For example, customer data, information on the particular template, and other details as previously discussed may be stored in a log, such as log 130. The method is done in block 525.

Figure 6:
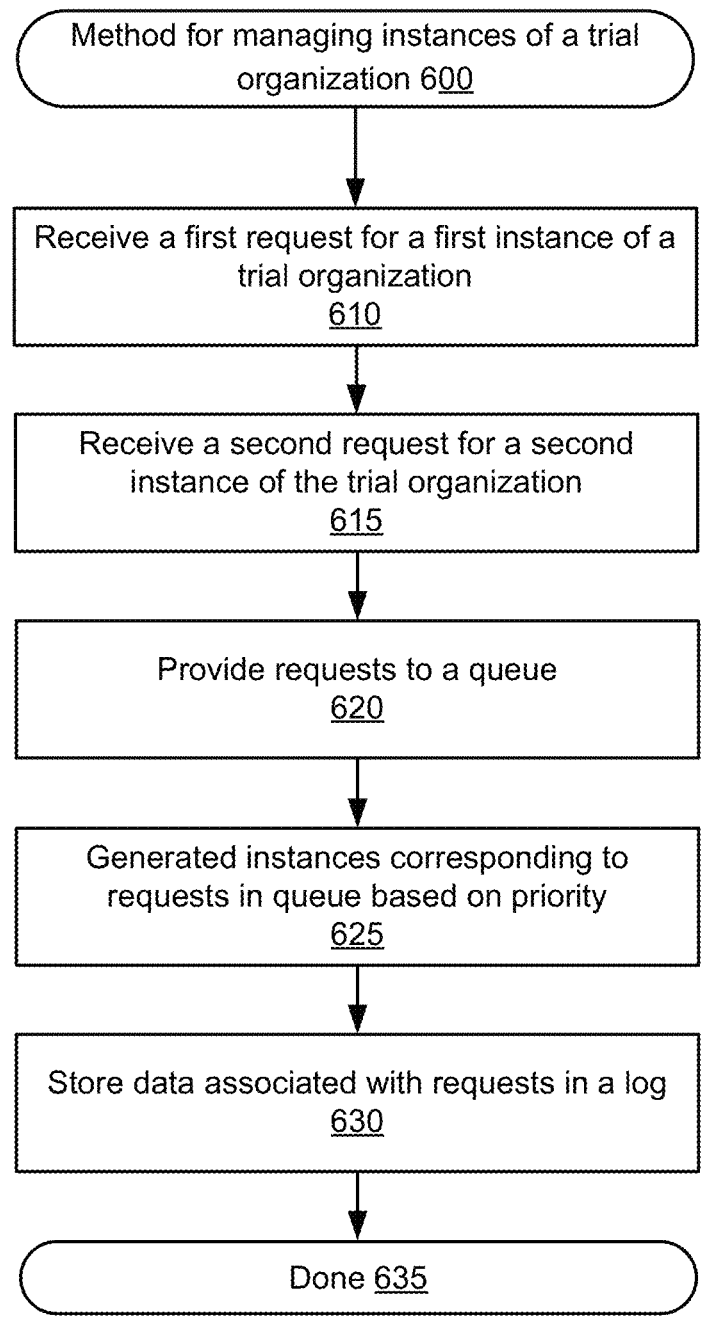
FIG. 6 shows a flowchart of another example of managing instances of a trial organization.
Figure 7A:
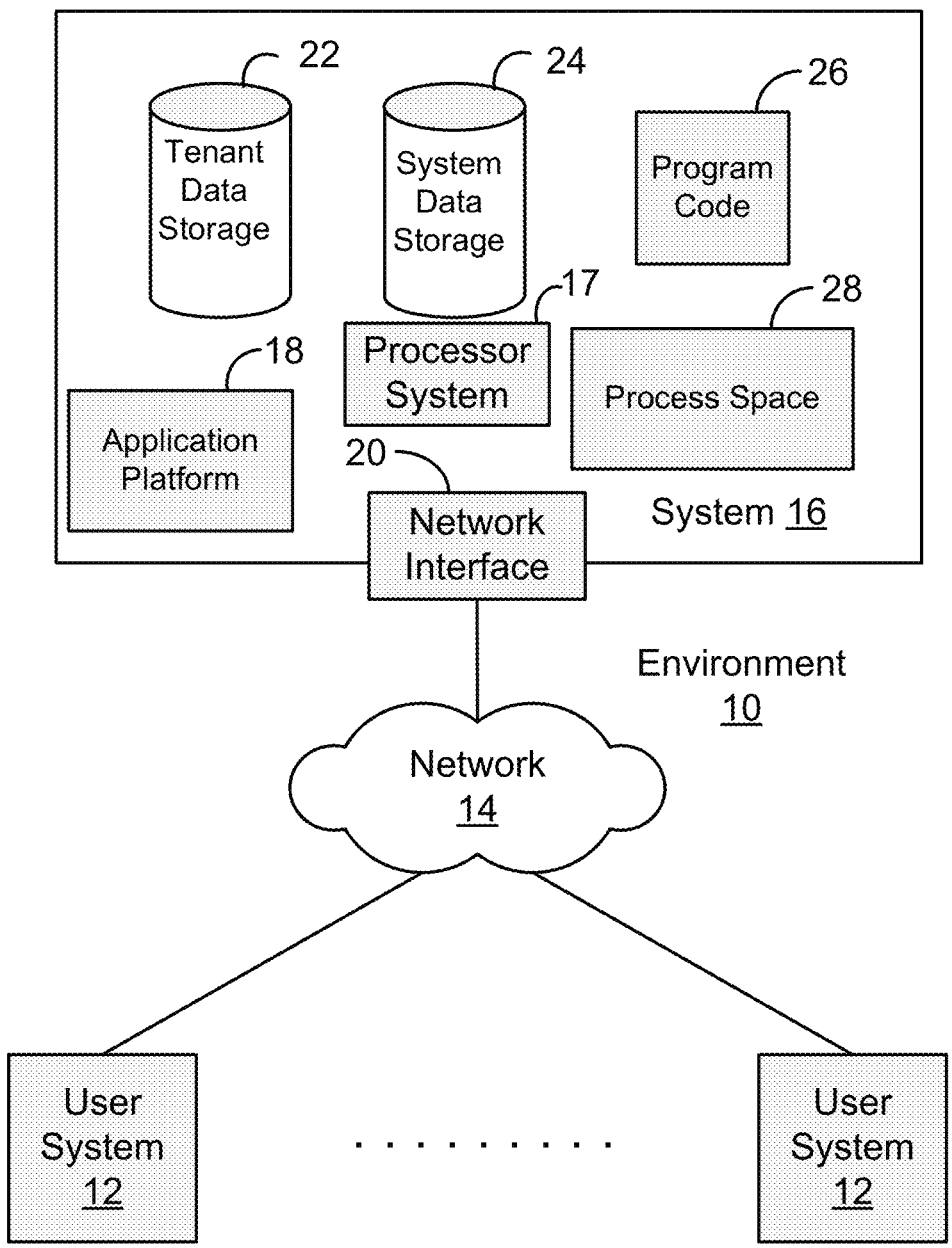
FIG. 7A shows a block diagram of an example of an environment 10 in which an on-demand database service can be used in accordance with some implementations.
Figure 7B:
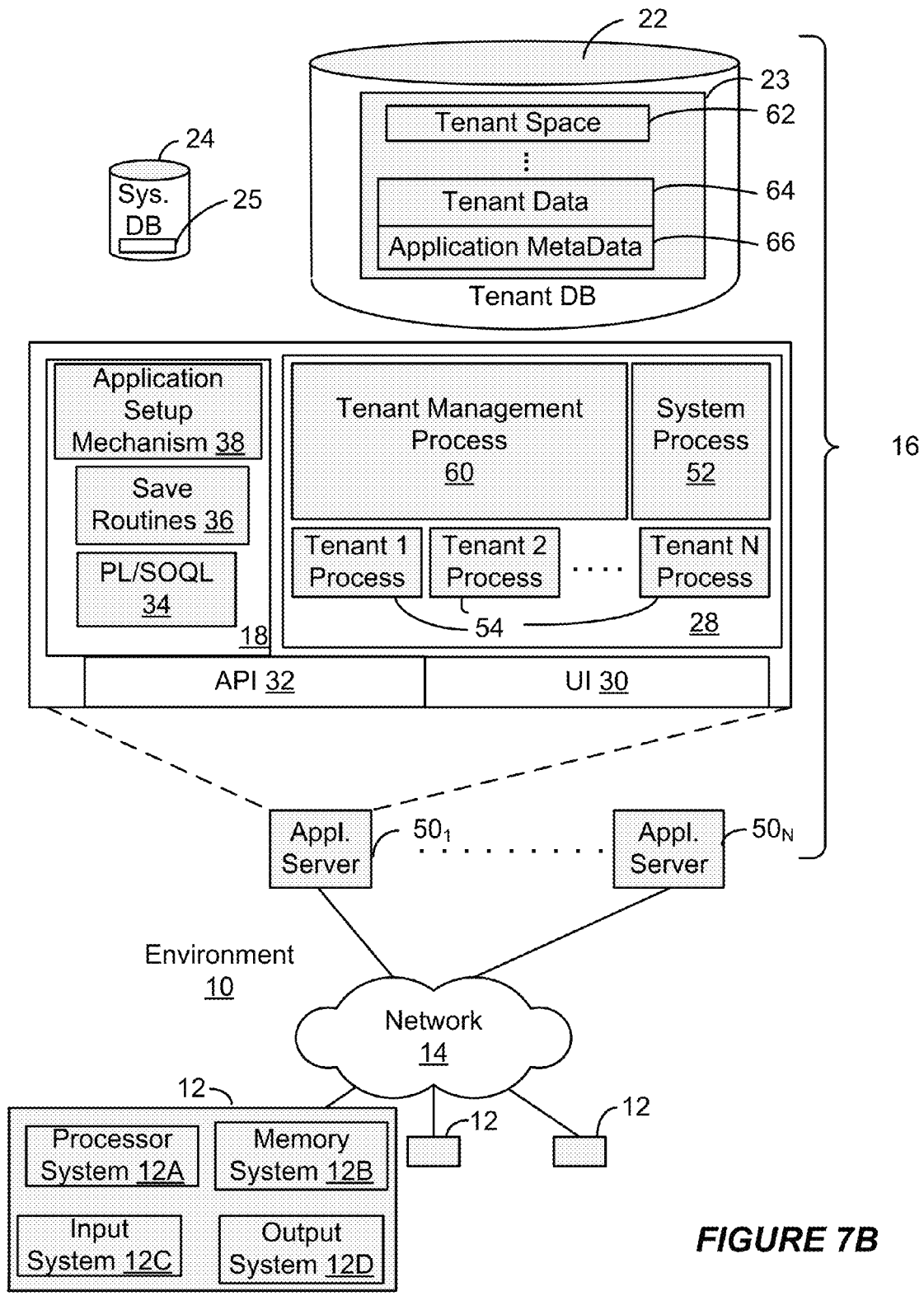
FIG. 7B shows a block diagram of an example of some implementations of elements of FIG. 7A and various possible interconnections between these elements.

FIG. 6 shows a flowchart of another example of managing instances of a trial organization. In method 600, at block 610, a first request for a first instance of a trial organization may be received. At block 615, a second request for a second instance of the trial organization may be received. For example, the requests may be from separate user systems.

Accordingly, in block 620, both of the requests may be provided to a queue to generate the instances corresponding to the requests. In block 625, the instances may be generated based on a priority. For example, requests from particular access channels, particular data provided by the user system, or other information as previously discussed may be used to determine the order of the generation of the instances.

In block 630, data associated with both of the requests may be stored in the log. The method is done in block 635.

Mechanisms and methods for providing systems implementing enterprise level social and business information networking are disclosed herein with reference to several implementations. Examples of database systems are described and can provide a platform for tracking events related to a record, actions of a user, and messages about a user or record. The disclosed systems support various data structures of feeds, the customization of feeds, selection of records and users to follow, generation of feeds, and display of feeds in suitable presentations on a user's display device.

Figure 8A:
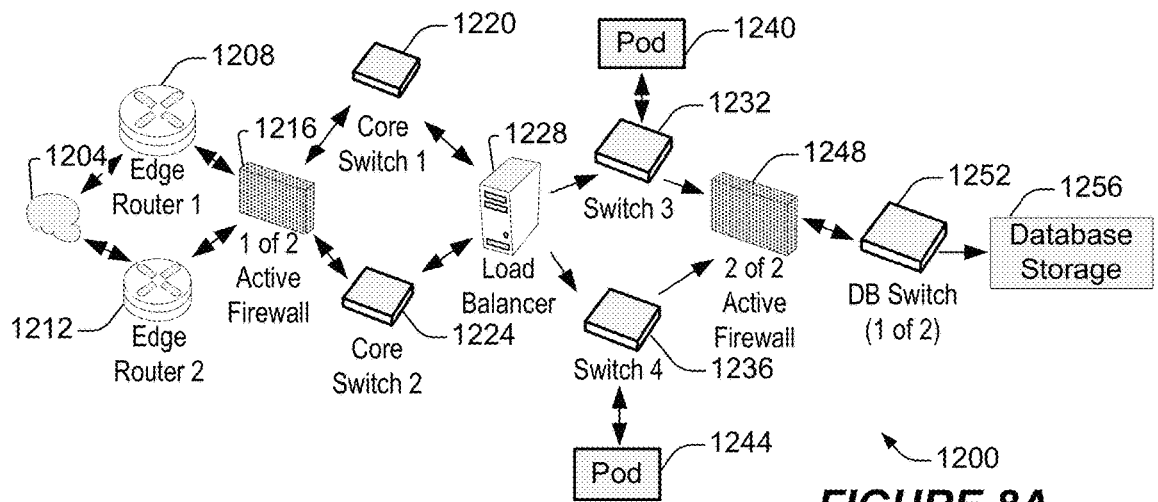
FIG. 8A shows a system diagram illustrating an example of architectural components of an on-demand database service environment 1200 according to some implementations.

FIG. 8A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 8B:
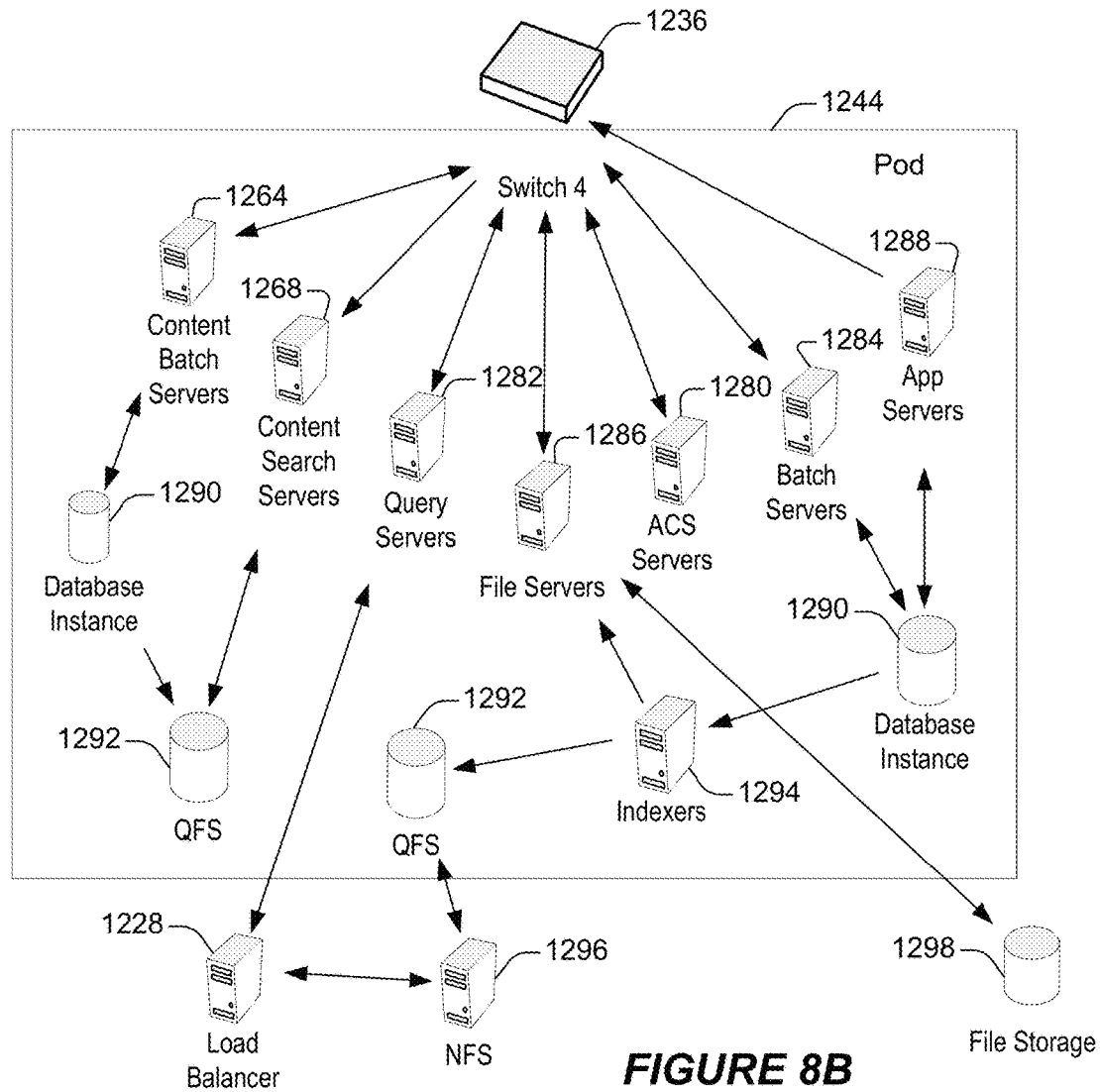
FIG. 8B shows a system diagram further illustrating an example of architectural components of an on-demand database service environment according to some implementations.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, tablet, smartphone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of HTTP application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 9A shows a system diagram illustrating an example of architectural components of an on-demand database service environment 1200 according to some implementations. A client machine located in the cloud 1204, generally referring to one or more networks in combination, as described herein, may communicate with the on-demand database service environment via one or more edge routers 1208 and 1212. A client machine can be any of the examples of user systems 12 described above. The edge routers may communicate with one or more core switches 1220 and 1224 via firewall 1216. The core switches may communicate with a load balancer 1228, which may distribute server load over different pods, such as the pods 1240 and 1244. The pods 1240 and 1244, which may each include one or more servers and/or other computing resources, may perform data processing and other operations used to provide on-demand services. Communication with the pods may be conducted via pod switches 1232 and 1236. Components of the on-demand database service environment may communicate with a database storage 1256 via a database firewall 1248 and a database switch 1252.

As shown in FIGS. 9A and 9B, accessing an on-demand database service environment may involve communications transmitted among a variety of different hardware and/or software components. Further, the on-demand database service environment 1200 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 1200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 1204 is intended to refer to a data network or plurality of data networks, often including the Internet. Client machines located in the cloud 1204 may communicate with the on-demand database service environment to access services provided by the on-demand database service environment. For example, client machines may access the on-demand database service environment to retrieve, store, edit, and/or process information.

In some implementations, the edge routers 1208 and 1212 route packets between the cloud 1204 and other components of the on-demand database service environment 1200. The edge routers 1208 and 1212 may employ the Border Gateway Protocol (BGP). The BGP is the core routing protocol of the Internet. The edge routers 1208 and 1212 may maintain a table of IP networks or 'prefixes', which designate network reachability among autonomous systems on the Internet.

In one or more implementations, the firewall 1216 may protect the inner components of the on-demand database service environment 1200 from Internet traffic. The firewall 1216 may block, permit, or deny access to the inner components of the on-demand database service environment 1200 based upon a set of rules and other criteria. The firewall 1216 may act as one or more of a packet filter, an application gateway, a stateful filter, a proxy server, or any other type of firewall.

In some implementations, the core switches 1220 and 1224 are high-capacity switches that transfer packets within the on-demand database service environment 1200. The core switches 1220 and 1224 may be configured as network bridges that quickly route data between different components within the on-demand database service environment. In some implementations, the use of two or more core switches 1220 and 1224 may provide redundancy and/or reduced latency.

In some implementations, the pods 1240 and 1244 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 1240 and 1244 may be conducted via the pod switches 1232 and 1236. The pod switches 1232 and 1236 may facilitate communication between the pods 1240 and 1244 and client machines located in the cloud 1204, for example via core switches 1220 and 1224. Also, the pod switches 1232 and 1236 may facilitate communication between the pods 1240 and 1244 and the database storage 1256.

In some implementations, the load balancer 1228 may distribute workload between the pods 1240 and 1244. Balancing the on-demand service requests between the pods may assist in improving the use of resources, increasing throughput, reducing response times, and/or reducing overhead. The load balancer 1228 may include multilayer switches to analyze and forward traffic.

In some implementations, access to the database storage 1256 may be guarded by a database firewall 1248. The database firewall 1248 may act as a computer application firewall operating at the database application layer of a protocol stack. The database firewall 1248 may protect the database storage 1256 from application attacks such as structure query language (SQL) injection, database rootkits, and unauthorized information disclosure.

In some implementations, the database firewall 1248 may include a host using one or more forms of reverse proxy services to proxy traffic before passing it to a gateway router. The database firewall 1248 may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some implementations, communication with the database storage 1256 may be conducted via the database switch 1252. The multi-tenant database storage 1256 may include more than one hardware and/or software components for handling database queries. Accordingly, the database switch 1252 may direct database queries transmitted by other components of the on-demand database service environment (e.g., the pods 1240 and 1244) to the correct components within the database storage 1256.

In some implementations, the database storage 1256 is an on-demand database system shared by many different organizations. The on-demand database system may employ a multi-tenant approach, a virtualized approach, or any other type of database approach. An on-demand database system is discussed in greater detail with reference to FIGS. 8A and 8B.

FIG. 9B shows a system diagram further illustrating an example of architectural components of an on-demand database service environment according to some implementations. The pod 1244 may be used to render services to a user of the on-demand database service environment 1200. In some implementations, each pod may include a variety of servers and/or other systems. The pod 1244 includes one or more content batch servers 1264, content search servers 1268, query servers 1282, file servers 1286, access control system (ACS) servers 1280, batch servers 1284, and app servers 1288. Also, the pod 1244 includes database instances 1290, quick file systems (QFS) 1292, and indexers 1294. In one or more implementations, some or all communication between the servers in the pod 1244 may be transmitted via the switch 1236.

In some implementations, the app servers 1288 may include a hardware and/or software framework dedicated to the execution of procedures (e.g., programs, routines, scripts) for supporting the construction of applications provided by the on-demand database service environment 1200 via the pod 1244. In some implementations, the hardware and/or software framework of an app server 1288 is configured to execute operations of the services described herein, including performance of the blocks of methods described with reference to FIGS. 1-7. In alternative implementations, two or more app servers 1288 may be included and cooperate to perform such methods, or one or more other servers described herein can be configured to perform the disclosed methods.

The content batch servers 1264 may handle requests internal to the pod. These requests may be long-running and/or not tied to a particular customer. For example, the content batch servers 1264 may handle requests related to log mining, cleanup work, and maintenance tasks.

The content search servers 1268 may provide query and indexer functions. For example, the functions provided by the content search servers 1268 may allow users to search through content stored in the on-demand database service environment.

The file servers 1286 may manage requests for information stored in the File storage 1298. The File storage 1298 may store information such as documents, images, and basic large objects (BLOBs). By managing requests for information using the file servers 1286, the image footprint on the database may be reduced.

The query servers 1282 may be used to retrieve information from one or more file systems. For example, the query system 1282 may receive requests for information from the app servers 1288 and then transmit information queries to the NFS 1296 located outside the pod.

The pod 1244 may share a database instance 1290 configured as a multi-tenant environment in which different organizations share access to the same database. Additionally, services rendered by the pod 1244 may call upon various hardware and/or software resources. In some implementations, the ACS servers 1280 may control access to data, hardware resources, or software resources.

In some implementations, the batch servers 1284 may process batch jobs, which are used to run tasks at specified times. Thus, the batch servers 1284 may transmit instructions to other servers, such as the app servers 1288, to trigger the batch jobs.

In some implementations, the QFS 1292 may be an open source file system available from Sun Microsystems® of Santa Clara, Calif. The QFS may serve as a rapid-access file system for storing and accessing information available within the pod 1244. The QFS 1292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 1268 and/or indexers 1294 to identify, retrieve, move, and/or update data stored in the network file systems 1296 and/or other storage systems.

In some implementations, one or more query servers 1282 may communicate with the NFS 1296 to retrieve and/or update information stored outside of the pod 1244. The NFS 1296 may allow servers located in the pod 1244 to access information to access files over a network in a manner similar to how local storage is accessed.

In some implementations, queries from the query servers 1222 may be transmitted to the NFS 1296 via the load balancer 1228, which may distribute resource requests over various resources available in the on-demand database service environment. The NFS 1296 may also communicate with the QFS 1292 to update the information stored on the NFS 1296 and/or to provide information to the QFS 1292 for use by servers located within the pod 1244.

In some implementations, the pod may include one or more database instances 1290. The database instance 1290 may transmit information to the QFS 1292. When information is transmitted to the QFS, it may be available for use by servers within the pod 1244 without using an additional database call.

In some implementations, database information may be transmitted to the indexer 1294. Indexer 1294 may provide an index of information available in the database 1290 and/or QFS 1292. The index information may be provided to file servers 1286 and/or the QFS 1292.

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

The tracking and reporting of updates to a record stored in a database system can be facilitated with a multi-tenant database system 16, e.g., by one or more processors configured to receive or retrieve information, process the information, store results, and transmit the results. In other implementations, the tracking and reporting of updates to a record may be implemented at least partially with a single tenant database system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer implemented method for managing instances of a trial organization, the method comprising:
receiving, at a server, information indicating a first request from a first access channel for a first instance of a trial organization, the trial organization providing a set of data and functionality;
generating the first instance of the trial organization, the first instance configured to provide access to the trial organization for a first period of time based on the first access channel;
receiving, at the server, information indicating a second request from a second access channel for a second instance of the trial organization, the first access channel and the second access channel being different and corresponding to different device types; and
generating the second instance of the trial organization, the second instance configured to provide access to the trial organization for a second period of time based on the second access channel, the first period of time and the second period of time being different.

2. The computer implemented method of claim 1, wherein the first instance of the trial organization corresponds to a first template of the trial organization, and the second instance of the trial organization corresponds to a second template of the trial organization.

3. The computer implemented method of claim 2, wherein the first template is based on the first access channel, and the second template is based on the second access channel.

4. The computer implemented method of claim 1, further comprising:
queuing the first request and the second request into a queue of requests, and wherein the generation of the first instance and the second instance is based on a priority corresponding to each instance in the queue.

5. The computer implemented method of claim 1, wherein the first request is associated with a first source, the first source providing an identifier, the identifier associated with the first instance of the trial organization responsive to the generation of the first instance.

6. One or more computing devices for using applications, the one or more computing devices comprising:
one or more processors operable to execute one or more instructions to cause a computing device to:
receive information indicating a first request from a first access channel for a first instance of a trial organization, the trial organization providing a set of data and functionality;
generate the first instance of the trial organization, the first instance configured to provide access to the trial organization for a first period of time based on the first access channel;
receive information indicating a second request from a second access channel for a second instance of the trial organization, the first access channel and the second access channel being different and corresponding to different device types; and
generate the second instance of the trial organization, the second instance configured to provide access to the trial organization for a second period of time based on the second access channel, the first period of time and the second period of time being different.

7. The one or more computing devices of claim 6, wherein the first instance of the trial organization corresponds to a first template of the trial organization, and the second instance of the trial organization corresponds to a second template of the trial organization.

8. The one or more computing devices of claim 7, wherein the first template is based on the first access channel, and the second template is based on the second access channel.

9. The one or more computing devices of claim 1, the one or more processors further operable to execute one or more instructions to cause the computing device to:
queue the first request and the second request into a queue of requests, and wherein the generation of the first instance and the second instance is based on a priority corresponding to each instance in the queue.

10. The one or more computing devices of claim 6, wherein the first request is associated with a first source, the first source providing an identifier, the identifier associated with the first instance of the trial organization responsive to the generation of the first instance.

11. A non-transitory computer readable medium having instructions stored thereon, the instructions configured to cause a computing device to:
receive information indicating a first request from a first access channel for a first instance of a trial organization, the trial organization providing a set of data and functionality;
generate the first instance of the trial organization, the first instance configured to provide access to the trial organization for a first period of time based on the first access channel;
receive information indicating a second request from a second access channel for a second instance of the trial organization, the first access channel and the second access channel being different and corresponding to different device types; and
generate the second instance of the trial organization, the second instance configured to provide access to the trial organization for a second period of time based on the second access channel, the first period of time and the second period of time being different.

12. The non-transitory computer readable medium of claim 11, wherein the first instance of the trial organization corresponds to a first template of the trial organization, and the second instance of the trial organization corresponds to a second template of the trial organization.

* * * * *